UNITED STATES PATENT OFFICE.

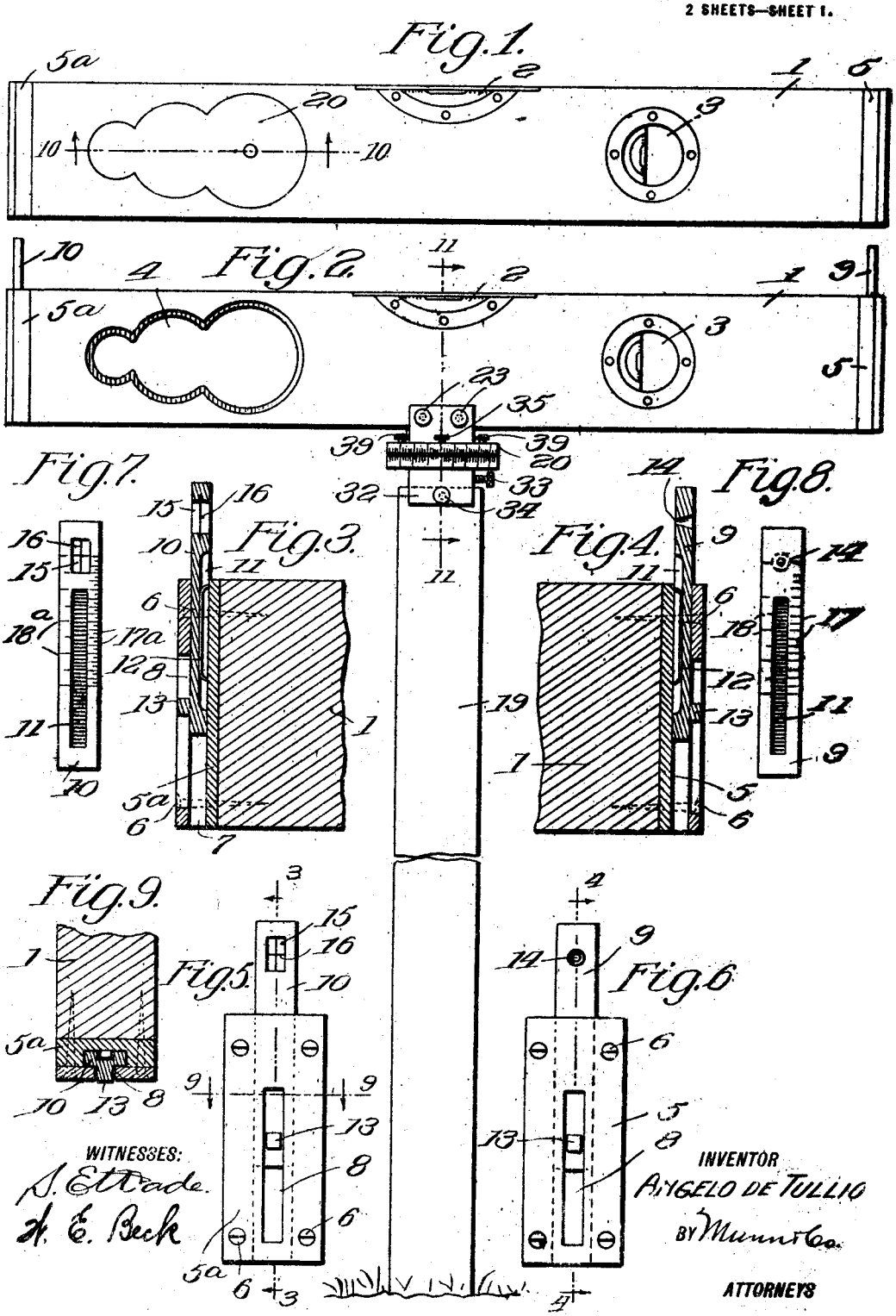
A. DE TULLIO.
CARPENTER'S LEVEL.
APPLICATION FILED AUG. 7, 1915.
1,188,158.
Patented June 20, 1916.
2 SHEETS—SHEET 1.

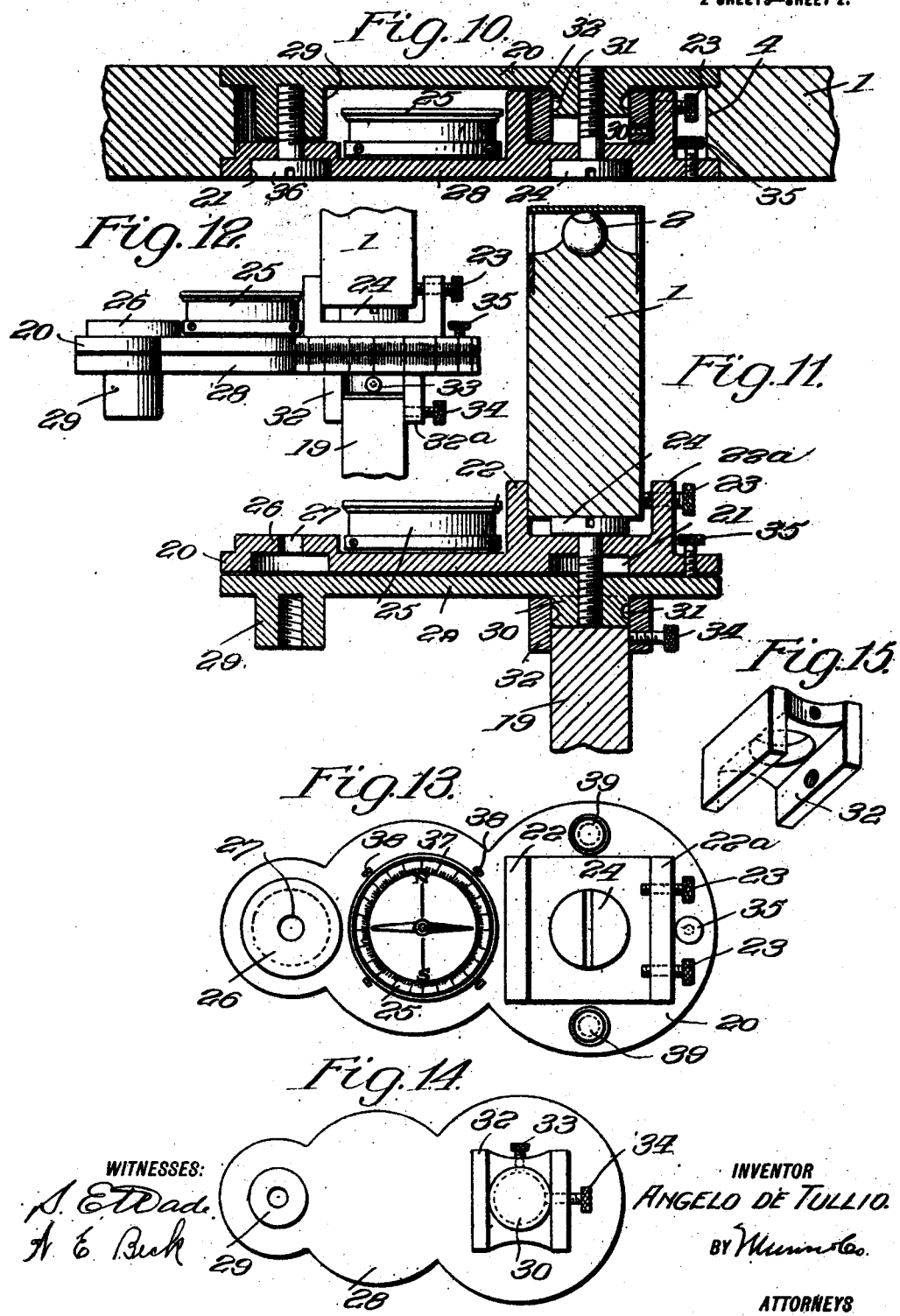

ANGELO DE TULLIO, OF ALBUQUERQUE, NEW MEXICO.

CARPENTER'S LEVEL.

1,188,158.         Specification of Letters Patent.         Patented June 20, 1916.

Application filed August 7, 1915. Serial No. 44,261.

*To all whom it may concern:*

Be it known that I, ANGELO DE TULLIO, a citizen of the United States, and a resident of Albuquerque, in the county of Bernalillo and State of New Mexico, have invented certain new and useful Improvements in Carpenters' Levels, of which the following is a specification.

My invention is an improvement in carpenters' levels, and the invention has for its object to provide an instrument of the character specified, adapted for use as a surveyor's level, and wherein the entire mechanism is housed in the bar of the level, in such a manner that it cannot be injured or damaged.

In the drawings: Figure 1 is a side view of the level; Fig. 2 is a similar view showing one application of the same; Figs. 3 and 9 are sections on the lines 3—3 and 9—9 respectively, of Fig. 5, each looking in the direction of the arrows adjacent to the line; Fig. 4 is a section on the line 4—4 of Fig. 6, looking in the direction of the arrows adjacent to the line; Figs. 5 and 6 are end views of the level, looking at opposite ends; Figs. 7 and 8 are similar views of the slides from the rear; Fig. 10 is a section on the line 10—10 of Fig. 1; Fig. 11 is a section on the line 11—11 of Fig. 2, both Figs. 10 and 11 looking in the direction of the arrows adjacent to the line; Fig. 12 is a side view of Fig. 13; Fig. 13 is a top plan view of Fig. 12; Fig. 14 is a rear view of Fig. 13, and Fig. 15 is a perspective view.

The present embodiment of the invention comprises a bar 1 of wood or like material, of suitable dimensions, provided at its center, and upon its upper edge with the usual horizontal level 2, for testing horizontal lines. The bar is also provided with a transverse opening near one end, in which is seated a vertical level of ordinary construction, for testing vertical lines. The bar is also provided near the opposite end of the level 3 with a transverse opening 4 for a purpose to be presently described, and a casing or guide-way is secured to each end of the bar. These casings 5 and 5ª are similar, each being of a width and length to fit smoothly against the end of the bar with its upper and lower ends and with its opposite side edges flush with the top and bottom and opposite faces of the bar, and each casing is provided with openings for receiving screws 6 or the like for holding the casing in place on the bar.

Each casing, as shown more particularly in Fig. 9, has a vertical passage-way 7, and a slot 8 at the front of the casing, extending vertically and opening into the guide-way. Slides 9 and 10 are mounted to move in the respective guide-ways, and each of the said slides 9 and 10 is provided on its rear or inner face with a depression 11 extending from near the lower end to near the upper end, and a series of teeth or corrugations is arranged in the bottom of each depression.

A spring 12 is arranged in each of the depressions, the ends of the spring being bent at an obtuse angle to the body, and the springs act to hold the slides 9 and 10 in adjusted position in the guide-ways. The bodies of the springs bear against the teeth or corrugations in the depression 11, and the ends of the spring bear against the bottom of the casing.

Each of the slides 9 and 10 is provided with a lug or button 13 on its outer face, and each button fits and moves within the adjacent slot 8 of the casing. The slides may move vertically in the casings, and the springs 12 will hold the slides in adjusted position.

The slide 9 is provided near its upper end and between the said end and the adjacent end of the depression 11 with a transverse opening 14, the said opening being tapering or frusto-conical as shown, and the small end of the opening is at the face adjacent to the depression 11.

The slide 10 is provided between the upper end of the depression 11 and the adjacent end of the slide with a rectangular opening 15, the said opening being arranged with its long axis parallel with the long axis of the slide, and cross wires 16 are arranged within the opening, the said cross wires intersecting at the center of the opening, and the intersection of the said wires is so arranged with respect to the opening 14, that the said intersection may be moved into register with the axis of the opening 14.

Each of the slides 9 and 10 is provided with two scales, 17 and 18 and 17ª and 18ª, respectively, at opposite edges of the rear or inner face, the said scales extending on the slide 9 from the axis of the opening 14 a little more than half the length of the slide, and on the slide 10 from the intersection of the cross wires a little more than half the length of the slide.

A clamp is provided for connecting the bar 1 to a standard or upright 19. This clamp is normally held within the opening 4, and the said clamp carries a compass and other mechanism to be later described. This mechanism is sectional, consisting of upper and lower sections. The upper section comprises a plate 20, consisting of three integrally connected disk-like portions intersecting each other, and gradually decreasing in diameter from one end of the plate to the other. At the largest of the said disks the plate 20 is provided on one face with a clamp for engaging the bar 1 and on the other face with a depression or recess 21. The clamp consists of oppositely arranged ribs 22 and 22ª spaced apart a little farther than the thickness of the bar 1, so that the said bar may rest between the ribs, and set screws 23 are threaded through the rib 22ª, to engage the bar to hold it in place between the ribs. The plate is also provided with a central opening at the depression 21, and a set screw 24 is passed through the opening, the head of the screw being above the plate, in such manner that the bar may rest thereon when it is in place.

A compass 25 is seated on the intermediate disk, and the central portion of the smallest disk is offset laterally in the same direction as the compass, to form on the opposite face a recess or depression 26, and this recess has a central opening 27.

The other or lower section 28 is similar in shape to the section 20, and at the smallest disk this plate is provided with an internally threaded boss 29, the opening of the boss registering with the opening 27 when the plates are seated upon each other.

At the opposite end the plate 28 is provided with a boss 30, the said boss being circular, and the plate is provided with a threaded opening at the axis of the boss, for receiving the set screw 24, when the plates are arranged as shown in Figs. 10 and 11. This boss is provided with an annular groove 31, and a clamping member 32 is mounted on the boss, the said clamping member comprising a body having a central opening for receiving the boss, and oppositely arranged laterally extending clamping ribs, for engaging opposite faces of the standard 19. The clamping member is held on the boss by a set screw 33, which is threaded through the body of the clamping member and engages the annular groove 31, to hold the clamping member on the boss.

A set screw 34 is threaded through one of the ribs of the clamping member, to engage the upper end of the standard or upright 19 to clamp the clamp 32 to the said standard or upright.

The plates 20 and 28 are pivotally connected when in use, in the position of Figs. 11 and 12, by means of the set screw 24, and they may be held from movement with respect to each other, by means of a set screw 35. This set screw is threaded through one end of the plate 20, into engagement with the adjacent end of the plate 28, and by tightening the set screw the plates may be held from movement with respect to each other.

When not in use, the plates are arranged in the opening of the bar in the manner shown in Fig. 10. The opposite faces of the bar 1 are counter-bored or rabbeted at the ends of the opening 4, and this opening is shaped like the plates. The plates are reversed with respect to each other from the position shown in Figs. 11 and 12, that is, with the compass 25 and the boss 29 inward. The clamp 22ª of the plate 20, and the set screw 24 is reversed, the head of the screw being received in the recess 21 in the plate 20. Another set screw 36, similar to the set screw 24 is passed through the opening 27 of the plate 20 into engagement with the boss 29, the head of the screw resting in the recess 26.

The clamp 32 is left in position, with the set screw 33 holding it in place. When it is desired to use the instrument, the set screws 24 and 36 are released, and the plates are arranged as shown in Figs. 11 and 12.

The bar 1 is clamped between the ribs 22 and 22ª, and the upper end of the standard or upright 19 is clamped by the clamp 32. The level on the bar 1 may now rotate on the spindle, by loosening the set screw 35, and when it is in adjusted position the parts may be held in this position by tightening the set screw.

Both plates may be rotated on the clamp 32, by loosening the set screw 33. When this screw is loosened, the entire mechanism above the clamp 32 may rotate with respect to the clamp.

The bar 1 rests upon the head of the set screw 24, when in use, and is held fixed with respect to the plates by means of the set screw 23. When not in use, the compass is protected in the casing formed by the plates 20 and 28.

It will be noted from an inspection of Figs. 2 and 12, that each of the plates 20 and 28 is provided with a scale on its edge, the said scales coöperating with each other, and the compass 25 is held in a ring 37 connected to the plate 20 in any suitable or desired manner. The compass is seated in the ring, and set screws 38 are threaded through the ring into engagement with the compass.

When used as a surveyor's level, a suitable support is used, and this support may be a stick of any character of suitable dimensions, the stick being driven into the ground until it is solidly held. The plates 20 and 28 are now removed from the opening 4, and arranged as shown in Figs. 11 and 12, the plate 20 being pivoted to the plate 28 by means of the set screw 24. The clamp 32 is clamped to the top of the upright or standard 19, and the bar 1 is clamped to the plate 20 by means of the set screw 23. The slides 9 and 10 are lifted to the same point, which may be determined by the scales 17—18 and 17ᵃ—18ᵃ, after which the level or bar 1 is leveled by means of the level 2.

The plate 20 may be adjusted with respect to the plate 28 by means of the set screw 35, and by means of set screws 39, the bar 1 may be lifted. These set screws 39 are threaded in the plate 20, and may be turned up or down to adjust the bar.

It will be noticed that the edge of the plate 28 has a scale 40, the scale being graduated in degrees, and a scale 41 is provided on the peripheral edge of the plate 20, for coöperating with the scale 40. This scale 41, as shown, is graduated from 0 to 15. The compass is set square with the line of the two levels 2 and 3 and is held in this position by the set screws 38. The bar 1 is now brought into exact alinement with one side of the angle to be measured when measuring horizontal angles, and the bar after being leveled and pointed or alined rightly is clamped in this position, and angle is noted on the scale 40. Some object in the line to be measured is brought into register with the intersection of the cross wires. The observer looks through the opening of the slide 10, and through the opening 14, and when the object appears through the opening 14 at the intersection of the cross wires, the bar 1 is clamped in this position, and the angle is noted on the scale 40. The bar is now released and swung into alinement with the other side of the angle and the same procedure is followed. The angle is noted, and the angle between two sides may be easily ascertained.

In measuring from a base line, the angle at each end of the line will be measured, after which, noting the base line and the two angles, the distance may be easily ascertained in a well known manner.

I claim:

1. A carpenter's level having horizontal and vertical levels, and provided at each end with a casing having a vertical guide-way and a slot communicating with the guide-way and extending to the outer face of the casing, a slide movable in the casing, one of the slides having a tapering opening, and the other having an opening provided with cross wires adapted to register with the axis of the opening in the first named slide, means for holding the slides in adjusted position, said means comprising a depression extending longitudinally of the rear face of each slide, and roughened at the bottom of the depression, an arched spring in each depression, and scales on the casing at the opposite sides of the slide, each slide having a lug extending through the slot for convenience in moving the slide.

2. A carpenter's level having horizontal and vertical levels, and provided at each end with a casing having a vertical guide-way and a slot communicating with the guide-way and extending to the outer face of the casing, a slide movable in each casing, one of the slides having a tapering opening, and the other having an opening provided with cross wires adapted to register with the axis of the opening in the first named slide, means for holding the slides in adjusted position, said means comprising a depression extending longitudinally of the rear face of each slide, and roughened at the bottom of the depression, an arched spring in each depression, each slide having a lug extending through the adjacent slot for convenience in moving the slide.

3. A carpenter's level having horizontal and vertical levels, and provided at each end with a casing having a vertical guide-way, and a slot communicating with the guide-way and extending to the outer face of the casing, a slide movable in each casing, one of the slides having a tapering opening, and the other having an opening provided with cross wires adapted to register with the axis of the opening in the first named slide, and means for holding the slides in adjusted position, each slide having a lug extending through the slot for convenience in moving the slide.

4. Means for securing a carpenter's level to a support in adjusted position, said means comprising complementary reversible plates having their outer faces flat, an internally threaded circular boss formed upon the inner face of one of said plates, a clamp upon the inner face of the remaining plate to receive such boss, a second clamp adapted to be received between the two plates or to be secured to the support and receive the said circular boss, and means for securing the plates in either adjusted position.

5. Means for securing a carpenter's level to a support in adjusted position, said means comprising complementary reversible plates, one of such plates having bosses projecting from a face thereof near opposite ends, the remaining plate having recesses in a face in coincident relation with the bosses, a clamp upon the opposite face of the recessed plate in line with a recess, a clamp adapted to be secured between the plates or to one of the bosses, and means for securing the plates with either of their faces in opposition.

6. Means for securing a carpenter's level to a support in adjusted position, said means comprising complementary reversible plates, means for connecting the plates and admitting of a pivotal movement of the level, other means for securing the plates in pivoted adjusted position, and leveling means for tilting one plate upon the other.

7. Means for securing a carpenter's level to a support in adjusted position, said means comprising complementary reversible plates, one of the plates having bosses upon a face at opposite ends, one of the bosses being circular, the remaining plate having recesses in a face in line with the bosses, and a clamp upon the opposite face to register with the circular boss to receive the same or the level, a second clamp adapted to receive the circular bosses, a compass adjustable upon the face of the plate provided with the fixed clamp, and means for securing the plates with either of their faces in juxtaposed position.

8. Means for securing a carpenter's level to a support or upright and for permitting the level to be rotated with respect to the support and having means for leveling the level, said clamping mechanism comprising plates adapted to be clamped together with either of their faces adjacent, one of the plates having on its inner face clamping means for engaging the level, and the other having on its inner face clamping means for engaging the upright, the first-named plate carrying a compass, and the plates having coöperating scales on their adjacent edges.

ANGELO DE TULLIO.

Witnesses:
  VENANZIO FERRARI,
  RAFFAELLO BALDWINI.